United States Patent Office 2,899,428
Patented Aug. 11, 1959

2,899,428

11-KETO DIOSGENIN

Edward S. Rothman, Philadelphia, and Monroe E. Wall, Oreland, Pa., assignors to the United States of America as represented by the Secretary of Agriculture No Drawing. Application March 5, 1957
Serial No. 644,183

4 Claims. (Cl. 260—239.55)

(Granted under Title 35, U.S. Code (1952), sec. 266)

A non-exclusive, irrevocable, royalty-free license in the invention herein described, throughout the world for all purposes of the United States Government with power to grant sub-licenses for such purposes is hereby granted to the Government of the United States of America.

The present invention relates to the preparation of 11-keto diosgenin (3β-hydroxy-22a,25D-spirost-5-en-11-one), a new steroidal substance useful for conversion to cortisone.

An object of this invention is to provide an improved starting material for the synthesis of cortisone or related compounds. Another object is to provide a new compound which may be readily converted to cortisone or related compounds by known chemical procedures. A further object is to utilize, in the preparation of said new compound, a naturally occurring steroid.

Desirable features in any cortisone precursor are the possession by the steroid of C–11 oxygenation, the ability to form, by appropriate treatment, the Δ⁴-3-ketone system, and a side chain capable of being converted to the desired dihydroxy-acetone side chain at C–17, that possessed by cortisone. The new compound, 11-keto diosgenin, fulfills all these requirements. First, the C–11 oxygenation is already present. Second, since this compound has an olefinic bond at C–5, the Δ⁴-3-ketone system can be easily formed by the well known procedure of Oppenauer oxidation. Third, the degradation of the sapogenin side chain to the desired cortisone side chain at C–17 is also well known to those skilled in the art.

The Oppenauer oxidation and the side chain degradation reactions, carried out on diosgenin, have formed the basis for synthesis of Reichstein's compound S by Julian et al., J. Am. Chem. Soc. 72, 5145 (1950).

The new compound, 11-keto diosgenin, has been converted to cortisone by the method disclosed in copending application Serial Number 644,184, filed March 5, 1957. The utility of 11-keto diosgenin is also demonstrable by its conversion to 11-keto tigogenin. Starting with 11-keto diosgenin acetate, the reactions of catalytic hydrogenation and subsequent oxidative restoration of the ketone group produces 11-keto tigogenin acetate. The latter compound, available from hecogenin, has been itself commercially utilized for cortisone manufacture, as for example, Djerassi et al., J. Am. Chem Soc., 74, 1712 (1952), but it is readily apparent that 11-keto diosgenin acetate is a preferable starting material for one bypasses several reaction steps necessary to convert the allosteroid, 11-keto tigogenin, to the Δ⁴-3-ketone system.

The new compound of the present invention is prepared by chemical transformations starting with the naturally occurring plant sapogenin, gentrogenin, found in *Dioscorea spiculiflora* (Chiapas, Mexico). Gentrogenin, 3β-hydroxy-22a,25D-spirost-5-en-12-one, has been described in patent application Serial Number 566,737, filed February 20, 1956. In addition to structural proof by conversion to 11-keto tigogenin, the new compound, 11-keto diosgenin, has been identified by determination of its physical and chemical characteristics.

The following diagrams and examples are given in illustration of the preparation and proof of structure of the new compound, 11-keto diosgenin.

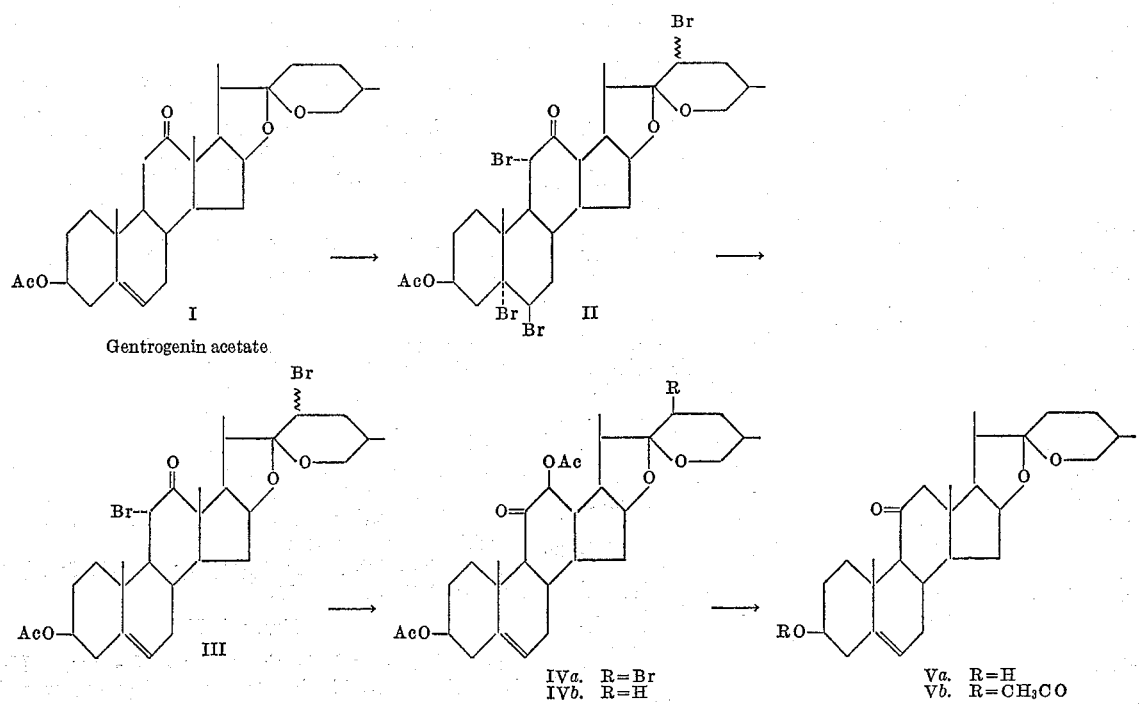

According to our invention, as illustrated in the above diagram, we brominate gentrogenin acetate to form the tetrabrominated compound, II. The tetrabrominated compound is selectively debrominated by iodide ion to form 11α,23-dibromo-gentrogenin acetate, III, which on treatment with alkali gives a hydrolytic rearrangement product, isolated as the diacetate, IVa. This hydrolytic rearrangement is related to the well-known Marker- Lawson acid rearrangement, but fortunately the product consists of a single, desired isomer instead of the mixture of four isomers obtained in the similar treatment of the Marker-Lawson bile acid mixture of which only one isomer is useful. We removed the remaining bromine from compound IVa with zinc dust and obtained 3β,12β-diacetoxy-22α,25D-spirost-5-en-11-one, IVb. We then selectively deacetoxylated IVb with a liquid ammonia solution of an alkali or alkaline earth metal, preferably calcium metal, thus obtaining our desired product, 11-keto diosgenin, Va, which we converted by acetylation to 11-keto diosgenin acetate Vb.

In the examples given below we have described only the reactions carried out using sterically pure gentrogenin as the starting material. In *Dioscorea spiculiflora* it frequently is the case that a diastereoisomer of gentrogenin, namely, correllogenin, occurs as a minor constituent. Correllogenin differs from gentrogenin only in the configuration of a methyl group in the side chain at position C–25. The reactions described in the examples may also be carried out with correllogenin in which case the end product is a diastereoisomer of 11-keto diosgenin, namely, 11-keto yamogenin. For practical purposes it is not necessary to purify or separate the diastereoisomers at any stage since the mixed product offers no disadvantages in practical work where degradation of the sapogenin side chain is carried out, for the reason that in all cases a single, pure pregnene derivative, namely 3β-hydroxy-5,16-pregnadiene-11,20-dione, is formed. This latter compound and the route leading to it is described in our copending patent application Serial Number 644,184, filed March 5, 1957.

Example I

3β-acetoxy-5α,6β,11α,23-tetrabromo-22a,25D-spirostan-12-one, II.—Gentrogenin acetate, I, 7.0 g. (0.01486 mole) in 76 ml. ordinary C.P. chloroform was treated at room temperature with a solution of 0.01486 mole bromine in 59 ml. carbon tetrachloride in the course of 5 minutes' time. The initial uptake was slow, but the rate of uptake accelerated with time. The bromine was added in batches rather than dropwise. The colorless solution was further treated with 1.9 ml. liquid bromine dissolved in 15 ml. chloroform. Various colorations, sometimes yellow-orange, pink or green developed during this second bromination, again carried out in only 5 minutes' time despite difficulties in visual observation of the bromine uptake. The solution was stirred, still at room temperature, for an additional 10 minutes and then all solvents were removed at 30° using water aspiration. The residue was a pale green glassy froth which on dissolution in 25 ml. of methylene chloride gave a green solution. Addition of ethanol incrementally caused color change to a pale pink. Absolute ethanol was then added as rapidly as possible without causing flocculation until a volume of 250 ml. of clear, nearly colorless solution was obtained. Stirring with scratching caused sudden crystallization of 11.1 g. of snow-white product (decomposing at 193° C. with effervescence and reddening).

Recrystallization was effected by dissolution in a minimal volume of hot methylene chloride, dilution with ether, and boiling off the methylene chloride azeotropically. The product formed a mass of felted microneedles melting suddenly at 199° C. with browning and effervescence. The analytical sample was recrystallized from methanol to give silky filaments, M.P. 199° C., $[\alpha]_D^{25}=-84.5°$.

*Analysis.*—Calcd. for $C_{29}H_{38}O_5Br_4$: C, 44.30; H, 4.87; Br, 40.66. Found: C, 44.16; H, 5.04; Br, 40.65.

Example II

Selective debromination of II to 3β-acetoxy-11α,23-dibromo-22a,25D-spirost-5-en-12-one (III).—A sample of II, 11 g., in 250 ml. of ethanol was refluxed for 2 hours with 14 g. of sodium iodide. The solids went into solution during the course of the reaction. The mixture was cooled, diluted with water and ether was added. A dilute solution of sodium thiosulfate was added in portions to just decolorize molecular iodine, avoiding excess reagent. The other layer was washed with 1% sodium-hydroxide to remove traces of carboxylic material, with water, with saturate saline solution, and after drying with sodium sulfate, was evaporated under reduced pressure at 30° C. to a pale-orange froth. Stirring with 35 ml. of absolute ethanol caused solution of the froth followed by precipitation of white crystalline III, 63% yield. The analytical sample was recrystallized from ethanol-methylene chloride to fine hexagonal blades blackening at 152° and melting with effervescence from 160–170° C. $[\alpha]_D^{25}=-81.9°$.

*Analysis.*—Calcd. for $C_{29}H_{38}C_5Br_2$: C, 55.60; H, 6.11; Br, 25.51. Found: C, 54.14; H, 6.18; Br, 24.99.

The compound is not stable in chloroform or methylene chloride solutions for prolonged periods of time. Analytically pure samples let stand overnight in chloroform solution developed deep pink coloration.

Example III 23-bromo-3β,12β-diacetoxy-22a,25D-spirost-5-en-11-one (IVa).—A sample of III, 5 g., suspended in 4.5 l. of 80% ethanol 0.3 N in potassium hydroxide was stirred at room temperature for 20 hours. The mixture was treated with 250 ml. of 6 N hydrochloric acid and was evaporated to 400 ml. under reduced pressure. The residue was diluted with water and extracted with ether. The ether was washed with 2% sodium hydroxide to remove a solid carboxylic acid and was dried with saturated brine and with sodium sulfate. The solid froth obtained by reduced pressure evaporation of the dried ether extract was acetylated in 50 ml. of acetic acid and 15 ml. of acetic anhydride in the presence of 1 ml. of 2.5 N perchloric acid in acetic acid during 1.5 hours at room temperature. The product was obtained by pouring the acetylation mixture into an excess of cold water and filtering off the flocculent precipitate. Crystallization of the air-dried product from ether gave 3.5 g. of IVa, M.P. 212–215° C. The analytical sample, $[\alpha]_D^{25}=-88.7°$, crystallized from ether melted from 214–216° C. without decomposition, although the colorless melt turned slightly brown soon after melting was completed.

*Analysis.*—Calcd. for $C_{31}H_{43}O_7Br$: C, 61.28; H, 7.13; Br, 13.15. Found: C, 61.30; H, 7.02; Br, 13.25.

Example IV

3β,12β-diacetoxy-22a,25D-spirost-5-en-11-one (IVb).—The product from the preceding preparation, diminished by the removal of 121 mg. for analytical and reference purposes, was refluxed 6 hours with zinc dust in acetic acid and the product isolated by dilution with water and extraction with ether and washing in the usual manner. The product, 2.13 g., obtained by crystallizing the evaporated ether extract from ethanol formed feathery, branched masses, M.P. 195–218° C. The analytical sample $[\alpha]_D^{25}=-106°$, recrystallized from ethanol began to undergo transition over 202° C. to elongated needles but melting occurred at 221–225° C. before the transition was completed.

*Analysis.*—Calcd. for $C_{31}H_{44}O_7$: C, 70.43; H, 8.39. Found: C, 70.71; H, 8.53.

Example V

3β-hydroxy-22a,25D-spirost-5-en - 11 - one, (11-keto diosgenin) Va.—Liquid ammonia, 1000 ml. was dried by treating with portions of calcium metal (1.7 g.) until a persisting blue color developed, after which point reagent calcium, 4.2 g. was added. The steroid, IVb, 14.3 g., was dissolved in 250 ml. of toluene, after which some of the toluene was distilled to remove traces of water. The solution of IVb was added to the liquid ammonia reagent during 8 minutes' time. After stirring for an additional 5 minutes the reaction mixture was decolorized by addition of 12 ml. of bromobenzene in 50 ml. of toluene. Next, 50 ml. of water was added cautiously. The ammonia was allowed to evaporate. The residue was taken up in ether and evaporated to dryness in vacuo. The residue was saponified with 10% sodium hydroxide at reflux for 0.5 hour. The product recovered by ether extraction was recrystallized from hexane and resolved on a Florisil column to give 10.5 g. 11-keto diosgenin, M.P. 180–183° C. $[\alpha]_D^{25} = -76°$.

*Example VI*

3β-acetoxy-22a,25D-spirost-5-en-11-one (*11-keto diosgenin acetate*) V*b*.—Acetylation of V*a* with refluxing acteic anhydride for one-holf hour followed by recovery and recrystallization of the steroid product, gave crystalline 11-keto diosgenin acetate, M.P. 221–222° C., $[\alpha]_D^{25} = -85°$.

*Example VII*

*Conversion of 11-keto diosgenin acetate to 11-keto tigogenin acetate.*—A sample of 11-keto diosgenin, 5 g., in 250 ml. of methanol containing 5% acetic acid was treated with 1 g. of platinum catalyst and hydrogen at 3 atmospheres for 8 hours. The steroid was precipitated by dilution with water, collected by filtration, and dried. The dry steroid was dissolved in pyridine and treated with a suspension of chromium trioxide for 5 hours. The mixture was diluted with water and extracted with ether. The ether extracts were washed with dilute hydrochloric acid, with 5% sodium bicarbonate, and with water. The crystalline product recovered from the ether by evaporation was 11-keto tigogenin acetate, which when recrystallized from ether-methanol melted at 229–232° C., $[\alpha]_D^{25} = -39°$.

We claim:

1. A compound selected from the group consisting of 11-keto diosgenin and 11-keto diosgenin acetate.
2. 11-keto diosgenin.
3. 11-keto diosgenin acetate.
4. A process for the preparation of 11-keto diosgenin which comprises reacting gentrogenin acetate with bromine to form a first reaction product consisting of 3 beta-acetoxy-5 alpha, 6 beta, 11 alpha, 23-tetrabromo-22a, 25D-spirostan-12-one, reacting said first reaction product with a member of the group consisting of sodium iodide and potassium iodide to form a second reaction product consisting of 3 beta-acetoxy-11 alpha, 23-dibromo-22 alpha, 25D-spirost-5-en-12-one, reacting said second reaction product with an alcoholic solution of an alkali to cause hydrolytic rearrangement and to form a third reaction product, acetylating said third reaction product to form a fourth reaction product consisting of 23-bromo-3 beta, 12 beta-diacetoxy-22a, 25D-spirost-5-en-11-one, debrominating said fourth reaction product by reacting it with zinc dust in a medium selected from the group consisting of ethanol and acetic acid to form a fifth reaction product consisting of 3 beta, 12 beta-diacetoxy-22a, 25D-spirost-5-en-11-one, and then selectively deacetoxylating said fifth reaction product by reacting it with a solution in liquid ammonia of a member selected from the group consisting of alkali and alkaline earth metals to product 11-keto diosgenin.

References Cited in the file of this patent

UNITED STATES PATENTS 2,774,713    Gould et al. _____ Dec. 18, 1956

OTHER REFERENCES

Djerassi: Chem. Abstracts, vol. 49, 1955, page 7585.